US010951345B2

(12) United States Patent
Matsuda et al.

(10) Patent No.: US 10,951,345 B2
(45) Date of Patent: Mar. 16, 2021

(54) OPTICAL COMMUNICATION DEVICE

(71) Applicant: Mitsubishi Electric Corporation, Tokyo (JP)

(72) Inventors: Keisuke Matsuda, Tokyo (JP); Ryosuke Matsumoto, Tokyo (JP); Naoki Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/634,859

(22) PCT Filed: Aug. 28, 2017

(86) PCT No.: PCT/JP2017/030677
§ 371 (c)(1),
(2) Date: Jan. 28, 2020

(87) PCT Pub. No.: WO2019/043747
PCT Pub. Date: Mar. 7, 2019

(65) Prior Publication Data
US 2020/0382235 A1 Dec. 3, 2020

(51) Int. Cl.
H04J 14/06 (2006.01)
H04B 10/61 (2013.01)
H04B 10/077 (2013.01)

(52) U.S. Cl.
CPC .......... *H04J 14/06* (2013.01); *H04B 10/0773* (2013.01); *H04B 10/0775* (2013.01); *H04B 10/6162* (2013.01); *H04B 10/6166* (2013.01)

(58) Field of Classification Search
CPC ............ H04B 10/0773; H04B 10/0775; H04B 10/6162; H04B 10/6166; H04J 14/06
(Continued)

(56) References Cited

U.S. PATENT DOCUMENTS

2007/0092259 A1* 4/2007 Bontu ............... H04J 14/06
398/147
2011/0255870 A1* 10/2011 Grigoryan ........... H04B 10/548
398/65
(Continued)

FOREIGN PATENT DOCUMENTS

JP 2006-262452 A 9/2006
JP 2009-512366 A 3/2009
(Continued)

OTHER PUBLICATIONS

International Search Report issued PCT/JP2017/030677 (PCT/ISA/210), dated Nov. 14, 2017.
(Continued)

*Primary Examiner* — Li Liu
(74) *Attorney, Agent, or Firm* — Birch, Stewart, Kolasch & Birch, LLP.

(57) ABSTRACT

A transmitter generates a burst signal obtained by multiplexing signals of a first polarization and a second polarization orthogonal to each other, and including, at the beginning thereof, a pilot sequence in which the first and the second polarizations each have single frequency components of a first frequency and a second frequency different from each other. A coherent light reception unit performs conversion into an electrical signal by allowing received light and local light to interfere with each other. A pilot sequence detection unit detects a pilot sequence from the converted electrical signal. The polarization estimation unit estimates polarization states of the first polarization and the second polarization at a receiver from frequency components corresponding to the first frequency, and the second frequency. An equalizer demultiplexes the first polarization and the second polarization on the basis of the estimated polarization states.

4 Claims, 5 Drawing Sheets

(58) Field of Classification Search
USPC .......................................... 398/65, 202–208
See application file for complete search history.

(56) References Cited

U.S. PATENT DOCUMENTS

| | | | |
|---|---|---|---|
| 2012/0070159 A1 | 3/2012 | Ishihara et al. | |
| 2012/0099864 A1* | 4/2012 | Ishihara | H04B 10/25133 398/65 |
| 2012/0148266 A1* | 6/2012 | Komaki | H04B 10/6166 398/210 |
| 2014/0037291 A1* | 2/2014 | Yan | H04B 10/6163 398/65 |
| 2015/0229364 A1* | 8/2015 | Kim | H04L 25/03343 370/329 |
| 2015/0341138 A1* | 11/2015 | Ishihara | H04B 10/2513 398/35 |
| 2016/0013863 A1* | 1/2016 | Dou | H04J 14/06 398/32 |
| 2016/0182182 A1* | 6/2016 | Schmogrow | H04J 14/06 398/65 |
| 2016/0269110 A1* | 9/2016 | Dahan | H04B 10/0793 |
| 2016/0277105 A1* | 9/2016 | Dou | H04B 10/0775 |
| 2016/0277405 A1* | 9/2016 | Weller | G06F 16/955 |
| 2019/0149231 A1* | 5/2019 | Li | H04B 10/07953 398/26 |

FOREIGN PATENT DOCUMENTS

| | | |
|---|---|---|
| JP | 2016-19289 A | 2/2016 |
| WO | WO 2007/045072 A1 | 4/2007 |
| WO | WO 2010/134321 A1 | 11/2010 |

OTHER PUBLICATIONS

Notice of Reasons for Refusal, Office Action for Japanese Application No. 2018-502191, dated Mar. 20, 2018.

Vacondio et al., "Coherent Receiver Enabling Data Rate Adaptive Optical Packet Networks", ECOC Technical Digest, Mo.2. A.4, 2011, pp. 1-3.

Extended European Search Report for European Application No. 17923485.1, dated Jul. 16, 2020.

Chinese Office Action and Search Report for Chinese Application No. 2017800938.7, dated Dec. 2020, with English translation.

* cited by examiner

OPTICAL COMMUNICATION DEVICE

TECHNICAL FIELD

The present invention relates to an optical communication device using digital coherent technology.

BACKGROUND ART

In an access optical communication system, a single optical line terminal (OLT) accommodates multiple optical network units (ONUs), so that signals are subjected to time-division multiplexing and transmitted for each customer in a passive optical network (PON). Therefore, the OLT receives a burst signal of about 10 μs transmitted from each ONU.

Introduction of digital coherent technology is expected as a method for expanding transmission capacity of an access optical communication system. In the digital coherent technology, signals can be multiplexed using two orthogonal polarizations, but it is necessary to demultiplex the multiplexed two polarizations in a receiver. A polarization state may change each time of burst reception due to changes in the shape of a transmission fiber and the like, and when receiving a burst signal of about 10 μs, it is necessary to estimate the polarization state and to perform demultiplexing at a high speed in about 1 μs.

A sequential update algorithm such as a constant modulus algorithm (CMA) is used to update a coefficient of an adaptive equalization filter that performs polarization demultiplexing, but there is a problem that it takes time to converge. There is also a problem that the adaptive equalization filter outputs the same polarization. In order to solve the above problems, a method has been conventionally disclosed in which the convergence of an adaptive equalization filter is sped up by adding a header signal composed only of each of the multiplexed polarizations to the beginning of a frame in a time-division manner, and estimating a polarization state of a burst signal from a polarization state of a received header (for example, see Non-Patent Literature 1).

CITATION LIST

Non-Patent Literatures

Non-Patent Literature 1: F. Vacondio, et al., "Coherent Receiver Enabling Data Rate Adaptive Optical Packet Networks", Proc. ECOC2011_Mo.2.A.4 (2011)

SUMMARY OF INVENTION

Technical Problem

However, the technique described in Non-Patent Literature 1 has a problem that a header portion becomes longer because a signal composed of only each of multiplexed polarizations is added in a time-division manner.

The present invention has been made to solve the above problems, and an object thereof is to provide an optical communication device capable of speeding up estimation of a polarization state and polarization demultiplexing of polarization multiplexed signals without making a header portion longer.

Solution to Problem

An optical communication device according to the present invention includes: a transmitter for transmitting optical signals including polarization multiplexed signals multiplexing signals of a first polarization on which a burst signal including, at the beginning thereof, a pilot sequence having a single frequency component of a first frequency, is generated and a second polarization orthogonal to the first polarization, on which a burst signal including, at the beginning thereof, a pilot sequence having a single frequency component of a second frequency different from the first frequency, is generated; a receiver for receiving an optical signal from the transmitter; the receiver including a coherent light reception unit for outputting a coherent detection signal by performing conversion into an electrical signal by allowing the optical signal transmitted from the transmitter and local light to interfere with each other; an A/D converter for converting the coherent detection signal output from the coherent light reception unit into a digital signal; a pilot sequence detection unit for detecting the pilot sequence from an output signal of the A/D converter; a polarization estimation unit for, when the pilot sequence detection unit detects the pilot sequence, estimating a polarization state of the first polarization at a receiver by performing maximal ratio combining on H polarization components and V polarization components at the first frequency in detected pilot sequences, and estimating a polarization state of the second polarization at the receiver by performing maximal ratio combining on H polarization components and V polarization components at the second frequency in detected pilot sequences; an equalizer for demultiplexing signals of the first polarization and signals of the second polarization from the output signal of the A/D converter on the basis of the estimated polarization states by the polarization estimation unit a phase estimation unit for estimating and compensating a phase of a signal of the first polarization and a signal of the second polarization demultiplexed by the equalizer; and a decoding unit for determining and decoding a signal of the first polarization and a signal of the second polarization, of which phase has been compensated by the phase estimation unit.

Advantageous Effects of Invention

The optical communication device according to the present invention includes a transmitter for transmitting optical signals including polarization multiplexed signals multiplexing signals of a first polarization on which a burst signal including, at the beginning thereof, a pilot sequence having a single frequency component of a first frequency, is generated and a second polarization orthogonal to the first polarization on which a burst signal including, at the beginning thereof, a pilot sequence having a single frequency component of a second frequency different from the first frequency, is generated; a receiver for receiving an optical signal from the transmitter; the receiver, when the pilot sequence detection unit detects the pilot sequence, estimating a polarization state of the first polarization at a receiver by performing maximal ratio combining on H polarization components and V polarization components at the first frequency in detected pilot sequences, and estimating a polarization state of the second polarization at the receiver by performing maximal ratio combining on H polarization components and V polarization components at the second frequency in detected pilot sequences Thus, the header portion of the burst signal is not made longer, and the polarization states of the multiplexed two polarizations at the receiver can be estimated simultaneously, which makes

DESCRIPTION OF EMBODIMENTS

Hereinafter, in order to describe the present invention in more detail, each embodiment of the present invention will be described with reference to the attached drawings.

First Embodiment

Figure 1:
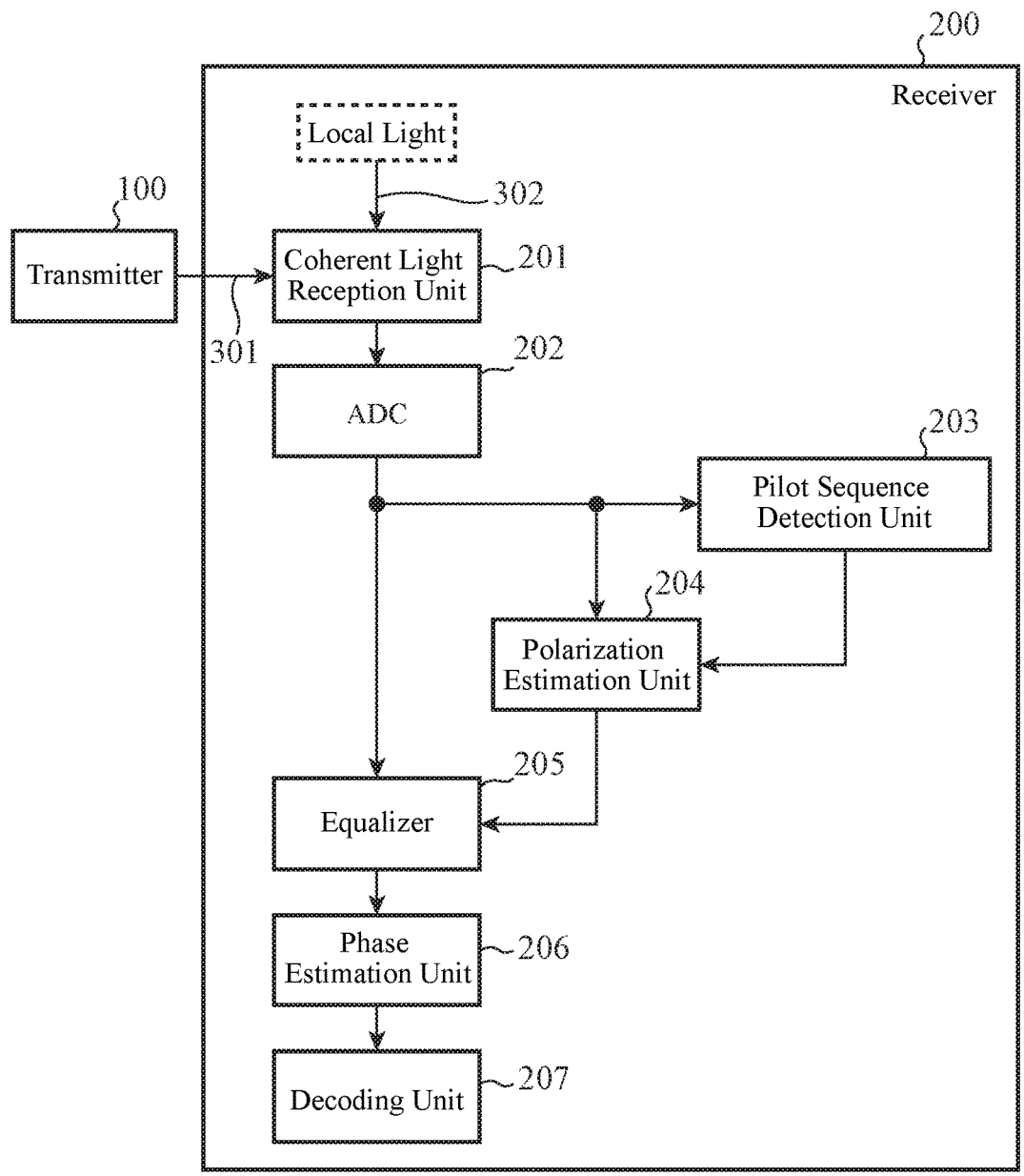
FIG. 1 is a configuration diagram illustrating an optical communication device of a first embodiment of the present invention.

FIG. 1 is a configuration diagram of an optical communication device according to the present embodiment.

The optical communication device according to the present embodiment includes a transmitter 100 and a receiver 200 as illustrated. The transmitter 100 is configured to generate a burst signal that is a polarization multiplexed signal obtained by multiplexing signals of a first polarization and a second polarization orthogonal to each other, and includes, at the beginning thereof, a pilot sequence in which the first polarization and the second polarization each have single frequency components of a first frequency and a second frequency different from each other. The receiver 200 is a receiver that receives an optical signal from the transmitter 100, and includes a coherent light reception unit 201, an A/D converter (ADC) 202, a pilot sequence detection unit 203, a polarization estimation unit 204, an equalizer 205, a phase estimation unit 206, and a decoding unit 207.

The coherent light reception unit 201 is a polarization and phase diversity coherent receiver that outputs a coherent detection signal by allowing received light 301 of an optical signal transmitted from the transmitter 100 to interfere with local light 302. The A/D converter 202 is an A/D converter that converts the coherent detection signal output from the coherent light reception unit 201 into a digital signal. The pilot sequence detection unit 203 is a processing unit that detects a pilot sequence by Fourier-transforming the digital signal from the A/D converter 202 and detecting a frequency peak of the Fourier-transformed signal. The polarization estimation unit 204 is a processing unit that, when the pilot sequence detection unit 203 detects the pilot sequence, estimates a polarization state of the first polarization at the receiver 200 by maximal ratio combining from a frequency component corresponding to the first frequency of the Fourier-transformed signal, and estimates a polarization state of the second polarization at the receiver 200 by maximal ratio combining from a frequency component corresponding to the second frequency of the Fourier-transformed signal. The equalizer 205 is a processing unit that functions as a polarization demultiplexing unit that demultiplexes the first polarization and the second polarization using the polarization states estimated by the polarization estimation unit 204. The phase estimation unit 206 is a processing unit that estimates and compensates a phase of a signal demultiplexed by the equalizer 205. The decoding unit 207 is a processing unit for determining and decoding the signal of which phase has been compensated by the phase estimation unit 206.

The functions of the transmitter 100 and the pilot sequence detection unit 203 to the decoding unit 207 in the receiver 200 are implemented by processing circuits. Each of the processing circuits may be dedicated hardware, or may be a processing circuit that uses a processor (also referred to as a central processing unit (CPU), a central processing device, an arithmetic device, a microprocessor, a microcomputer, or a digital signal processor (DSP)) that executes a program stored in a memory. When the processing circuit is dedicated hardware, the processing circuit corresponds to, for example, a single circuit, a composite circuit, a programmed processor, a parallel programmed processor, an application specific integrated circuit (ASIC), a field programmable gate array (FPGA), or a combination thereof. Each of the functions of polarization demultiplexing, phase estimation, polarization compensation, and decoding may be implemented by a processing circuit, or the functions may be implemented collectively by a single processing circuit.

Figure 2:
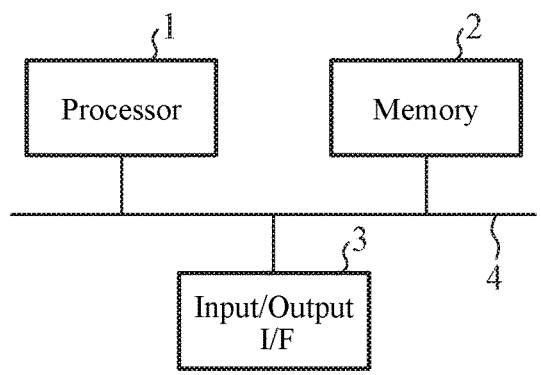
FIG. 2 is a hardware configuration diagram of the optical communication device of the present invention.

FIG. 2 is a hardware configuration diagram of the transmitter 100 and the receiver 200 when the optical communication device is configured by executing a program. The illustrated configuration includes a processor 1, a memory 2, an input/output interface (I/F) 3, and a bus 4. The processor 1 is a processor for performing a process as the transmitter 100 or the receiver 200. The memory 2 is, for example, a nonvolatile or volatile semiconductor memory such as a RAM, a ROM, a flash memory, an EPROM, or an EEPROM; a removable media drive such as a magnetic disk, a flexible disk, an optical disc, a compact disc, a mini disc, or a DVD, or a hard disk device (HDD). The input/output I/F 3 is an interface for inputting/outputting signals to and from the outside. The bus 4 is a communication path for connecting the processor 1, the memory 2, and the input/output I/F 3 to one another. When the transmitter 100 illustrated in FIG. 1 is implemented by the hardware of FIG. 2, a configuration thereof is implemented by storing a program corresponding to the function of the transmitter 100 in the memory 2, and by the processor 1 reading and executing the program. When the receiver 200 is implemented by the hardware illustrated in FIG. 2, each configuration of the pilot sequence detection unit 203 to the decoding unit 207 is implemented by storing programs corresponding to the functions of the pilot sequence detection unit 203 to the decoding unit 207 in the memory 2, and by the processor 1 reading and executing each program. That is, a step of detecting a pilot sequence, a step of estimating a polarization state, a step of demultiplexing polarization by equalizing distortion of a signal, a step of updating a coefficient of an equalizer, and a step of performing decoding are performed as a result.

Regarding the functions of the pilot sequence detection unit 203, the polarization estimation unit 204, the equalizer 205, the phase estimation unit 206, and the decoding unit 207, a part thereof may be implemented by dedicated hardware, and another part thereof may be implemented by software or firmware. For example, functions other than determination and decoding functions can be implemented by a processing circuit as dedicated hardware, and the determination and decoding functions can be implemented by a processing circuit reading and executing a program stored in a memory.

Next, the operation of the optical communication device of the first embodiment will be described.

First, the operation of the transmitter 100 will be described.

Figure 3:
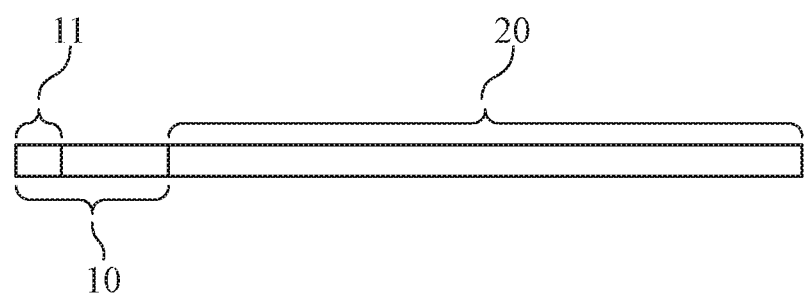
FIG. 3 is an explanatory diagram illustrating a frame configuration of a burst signal used by the optical communication device of the first embodiment of the present invention.
Figure 4:
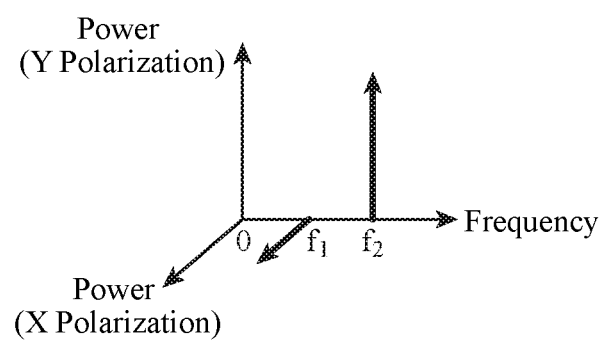
FIG. 4 is an explanatory diagram illustrating a spectrum of a pilot sequence in the burst signal used by the optical communication device of the first embodiment of the present invention.

FIG. 3 illustrates a frame configuration of a burst signal used by the optical communication device, and FIG. 4 illustrates a spectrum of a pilot sequence of the burst signal. The burst signal includes signals multiplexed in X polarization and Y polarization orthogonal to each other, and includes a header 10 including communication control information and a payload 20 corresponding to communication data, as illustrated in FIG. 3. The burst signal includes a pilot sequence 11 at the beginning of the header 10, and in the pilot sequence 11, the X polarization and the Y polarization are each composed of only components of single frequencies f1 and f2 different from each other, as illustrated in FIG. 4. In the first embodiment, the first polarization is X polarization and the second polarization is Y polarization, as well as the first frequency is frequency f1 and the second frequency is frequency f2.

Figure 5:
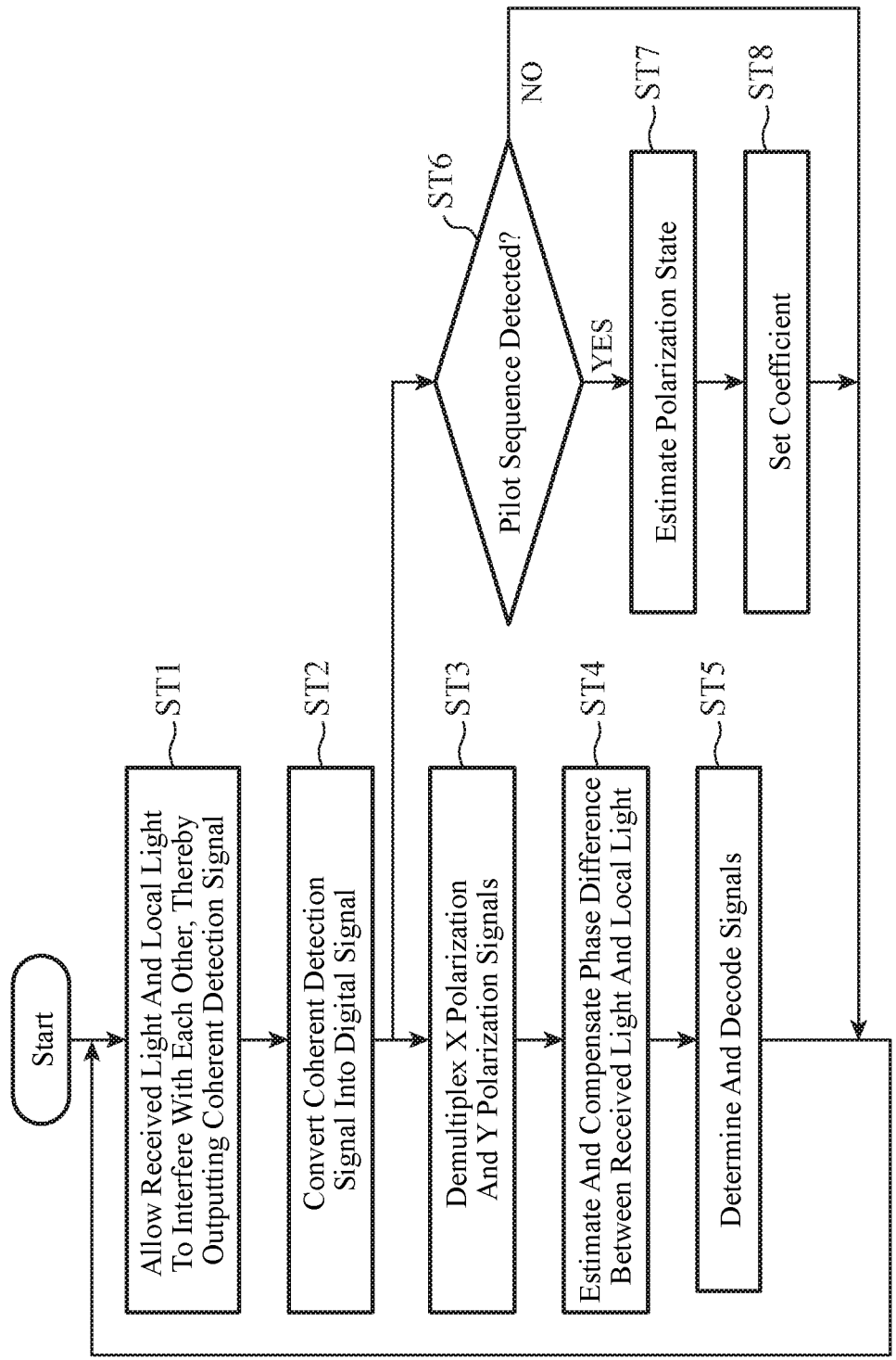
FIG. 5 is a flowchart illustrating operation of the optical communication device of the first embodiment of the present invention.

Next, the operation on a side of the receiver 200 will be described on the basis of the flowchart of FIG. 5.

The coherent light reception unit 201 receives a burst signal from the transmitter 100 such as that illustrated in FIG. 3, and allows the received light to interfere with local light, thereby outputting a coherent detection signal (Step ST1). Next, the A/D converter 202 converts the coherent detection signal, which is an analog signal, into a digital signal (Step ST2). Next, the equalizer 205 demultiplexes the multiplexed X polarization and Y polarization signals from H polarization and V polarization signals in the receiver 200 (Step ST3). The equalizer 205 may have, in addition to the polarization demultiplexing function indicated in formulas (3) and (4), a filter function for compensating a frequency response of the receiver.

For the demultiplexed X-polarization and Y-polarization signals, the phase estimation unit 206 estimates and compensates a phase difference between the received light and the local light (Step ST4). The phase-compensated signals are determined and decoded by the decoding unit 207 (Step ST5). On the other hand, the pilot sequence detection unit 203 monitors a signal from the A/D converter 202 to detect a pilot sequence (Step ST6). Since a pilot signal has frequency peaks at frequencies f1 and f2, the pilot sequence can be detected, for example, by Fourier-transforming a signal and detecting a frequency peak of the Fourier transformed signal. When the pilot signal is detected, the polarization estimation unit 204 estimates a polarization state at the receiver 200 of a signal assigned to the X polarization in the transmitter 100 by maximal ratio combining from a component of the frequency f1 of the pilot signal, and estimates a polarization state at the receiver 200 of a signal assigned to the Y polarization in the transmitter 100 by maximal ratio combining from a component of the frequency f2 of the pilot signal (Step ST7). For example, when H polarization and V polarization components in the receiver corresponding to the frequency f1 of the Fourier-transformed pilot signal are $E_A$ and $E_B$, respectively, and H polarization and V polarization components in the receiver corresponding to the frequency f2 of the pilot signal are $E_C$ and $E_D$, respectively, it is estimated that the multiplexed X polarization and Y polarization are each changed at the receiver to polarization states indicated by Jones vectors in formulas (1) and (2).

$$\frac{1}{\sqrt{|E_A|^2 + |E_B|^2}} \begin{bmatrix} E_A \\ E_B \end{bmatrix} \quad (1)$$

$$\frac{1}{\sqrt{|E_C|^2 + |E_D|^2}} \begin{bmatrix} E_C \\ E_D \end{bmatrix} \quad (2)$$

The equalizer 205 sets a coefficient so that the multiplexed X polarization and Y polarization signals are demultiplexed from the H polarization and V polarization signals in the receiver 200 by formulas (3) and (4) on the basis of the estimation results of the polarization estimation unit 204 (Step ST8). When no pilot sequence is detected, the coefficient is not changed.

$$E_X = [E_A^* \quad E_B^*] \begin{bmatrix} E_H \\ E_V \end{bmatrix} \quad (3)$$

$$E_Y = [E_C^* \quad E_D^*] \begin{bmatrix} E_H \\ E_V \end{bmatrix} \quad (4)$$

As described above, the optical communication device of the first embodiment includes: the transmitter for generating a burst signal that is a polarization multiplexed signal obtained by multiplexing signals of a first polarization and a second polarization orthogonal to each other, and includes, at the beginning thereof, a pilot sequence in which the first polarization and the second polarization each have single frequency components of a first frequency and a second frequency different from each other; the coherent light reception unit for performing conversion into an electrical signal by allowing received light of the burst signal transmitted from the transmitter and local light to interfere with each other; the A/D converter for converting an electrical signal output from the coherent light reception unit into a digital signal; the pilot sequence detection unit for detecting the pilot sequence from an output signal of the A/D converter; the polarization estimation unit for, when the pilot sequence detection unit detects the pilot sequence, estimating a polarization state of the first polarization at a receiver from a frequency component corresponding to the first frequency of a pilot signal, and estimating a polarization state of the second polarization at the receiver from a frequency component corresponding to the second frequency of the pilot signal; the equalizer for demultiplexing the first polarization and the second polarization from the output signal of the A/D converter on the basis of the estimated polarization states; the phase estimation unit for estimating and compensating a phase of a signal demultiplexed by the equalizer; and the decoding unit for determining and decoding a signal of which phase has been compensated by the phase estimation unit. Consequently, the header portion of the burst signal is not made longer, and the polarization states of the multiplexed two polarizations at the receiver can be estimated simultaneously, which makes it possible to speed up estimation of the polarization states and polarization demultiplexing of the polarization multiplexed signals.

Figure 6:
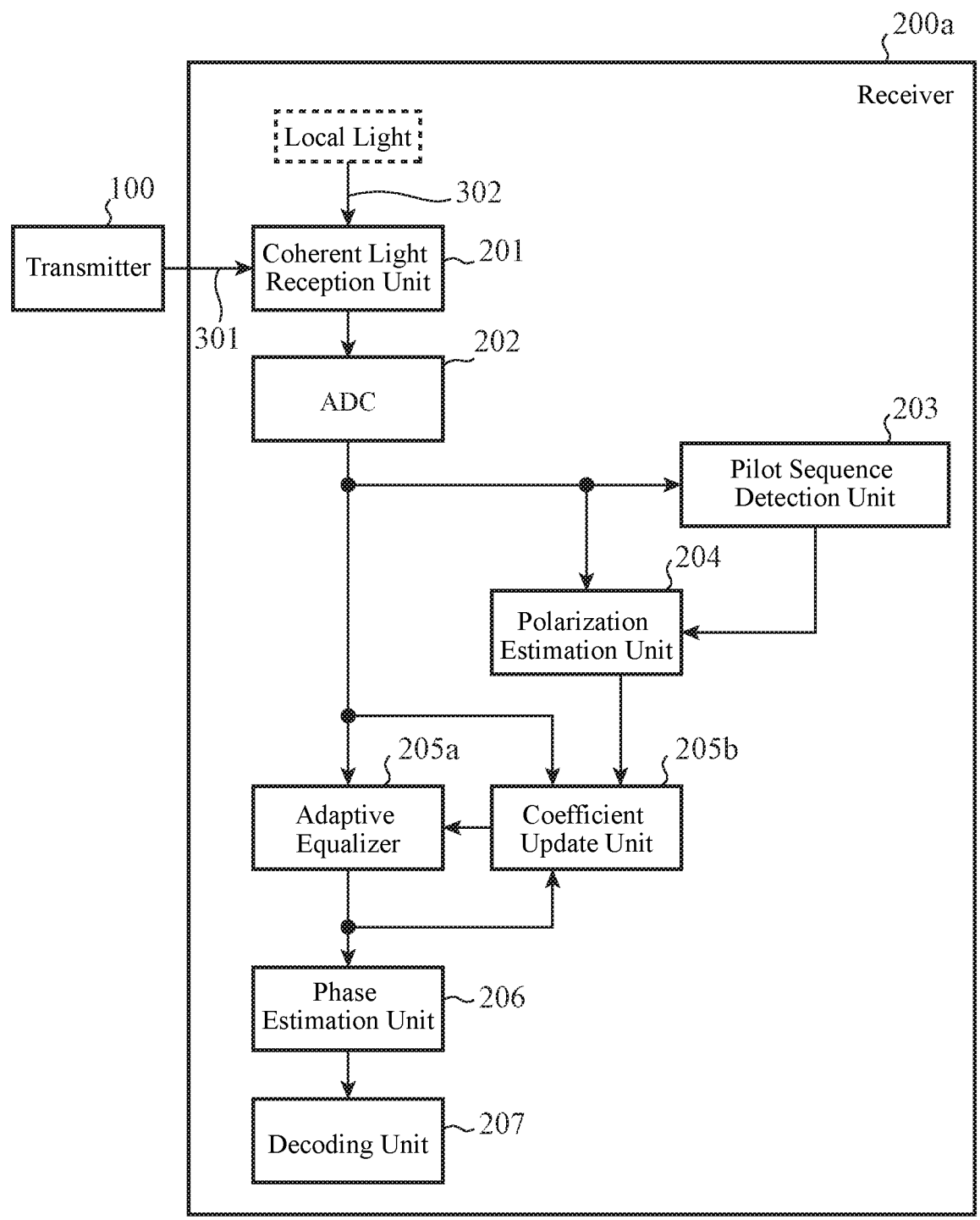
FIG. 6 is a configuration diagram illustrating an optical communication device of a second embodiment of the present invention.

In addition, according to the optical communication device of the first embodiment, the pilot sequence detection unit detects a pilot sequence by Fourier-transforming an output signal of the A/D converter, and when the pilot sequence detection unit detects the pilot sequence, the polarization estimation unit estimates a polarization state of the first polarization at the receiver by maximal ratio combining from a frequency component corresponding to the first frequency of the Fourier-transformed signal, and estimates a polarization state of the second polarization at the receiver by maximal ratio combining from a frequency component corresponding to the second frequency of the Fourier-transformed signal, which makes it possible to speed up estimation of a polarization state and polarization demultiplexing of polarization multiplexed signals Second Embodiment FIG. 6 is a configuration diagram of an optical communication device of a second embodiment. Here, the configuration of the transmitter 100 and the configurations of the coherent light reception unit 201, the A/D converter 202, the pilot sequence detection unit 203, the polarization estimation unit 204, the phase estimation unit 206, and the decoding unit 207 in a receiver 200a are similar to those of the first embodiment illustrated in FIG. 1, so that corresponding parts are denoted by the same reference numerals and descriptions thereof will be omitted.

In the second embodiment, an adaptive equalizer 205a and a coefficient update unit 205b are included instead of the equalizer 205 in the first embodiment. The adaptive equalizer 205a includes, for example, a butterfly FIR filter, and depending on a change in a received signal, adaptively equalizes the signal. For example, when a modulation scheme is polarization-multiplexed quaternary phase-shift keying, a filter coefficient of the adaptive equalizer 205a is updated by the coefficient update unit 205b on the basis of a result calculated using the constant modulus algorithm (CMA).

Regarding the hardware configuration of the optical communication device of the second embodiment, a basic configuration thereof is similar to that of the first embodiment. That is, the adaptive equalizer 205a and the coefficient update unit 205b may be configured by dedicated hardware, and programs corresponding each function may be stored in the memory 2 illustrated in FIG. 2 and executed by the processor 1.

Figure 7:
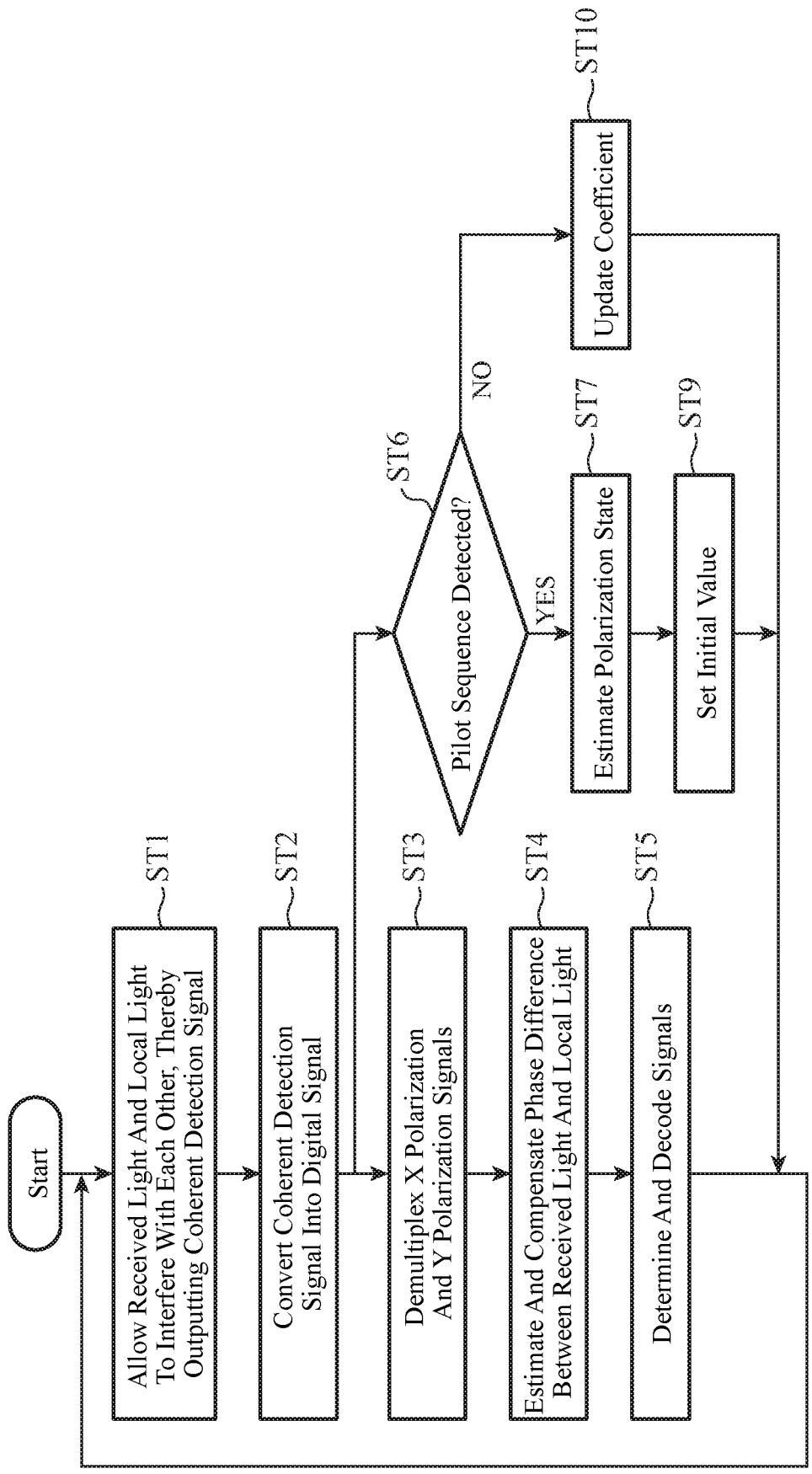
FIG. 7 is a flowchart illustrating operation of the optical communication device of the second embodiment of the present invention.

Next, the operation of the optical communication device of the second embodiment will be described with reference to the flowchart of FIG. 7.

First, since the operation in Steps ST1 to ST7 is similar to that in the first embodiment, description thereof will be omitted here. In the second embodiment, when the polarization estimation unit 204 estimates the polarization state in Step ST7, the coefficient update unit 205b sets an initial value for the adaptive equalizer 205a so that the multiplexed X polarization and Y polarization signals are demultiplexed from the H polarization and V polarization signals in the receiver 200a as indicated in formulas (3) and (4) (Step ST9). On the other hand, when no pilot sequence is detected, that is, for a signal of the header 10 and the payload 20 of the burst signal, a coefficient is updated by the coefficient update unit 205b (Step ST10).

As described above, the optical communication device of the second embodiment includes the adaptive equalizer and the coefficient update unit instead of the equalizer of the first embodiment, and the coefficient update unit updates a coefficient of the adaptive equalizer using, as an initial value, setting for demultiplexing the first polarization and the second polarization on the basis of the polarization states estimated by the polarization estimation unit, and therefore, it is possible to achieve reduction in a period of time from the start of reception of the burst signal until the convergence of the adaptive equalizer in addition to the effects of the first embodiment.

It should be noted that, in the present invention, each of the embodiments can be freely combined with another embodiment, any constituent element of each embodiment can be modified, or any constituent element can be omitted in each embodiment, within the scope of the invention.

INDUSTRIAL APPLICABILITY

As described above, the optical communication device according to the present invention relates to a configuration that multiplexes and demultiplexes signals using two orthogonal polarizations using digital coherent technology, and is suitably used in an access optical communication system.

REFERENCE SIGNS LIST

10: header, 11: pilot sequence, 20: payload, 100: transmitter, 200, 200a: receiver, 201: coherent light reception unit, 202: A/D converter (ADC), 203: pilot sequence detection unit, 204: polarization estimation unit, 205: equalizer, 205a: adaptive equalizer, 205b: coefficient update unit, 206: phase estimation unit, 207: decoding unit, 301: received light, 302: local light.

The invention claimed is:

1. An optical communication device comprising:
a transmitter to transmit optical signals including polarization multiplexed signals multiplexing signals of a first polarization on which a burst signal including, at a beginning thereof, a pilot sequence having a single frequency component of a first frequency, is generated and a second polarization orthogonal to the first polarization, on which a burst signal including, at a beginning thereof, a pilot sequence having a single frequency component of a second frequency different from the first frequency, is generated; and
a receiver receive the optical signals from the transmitter; wherein the receiver includes:
a coherent light receptor to output a coherent detection signal by performing conversion into an electrical signal by allowing the optical signals transmitted from the transmitter and local light to interfere with each other;
an A/D converter to convert the coherent detection signal output from the coherent light receptor into a digital signal;
a pilot sequence detector to detect the pilot sequence from an output signal of the A/D converter;
a polarization estimator to, when the pilot sequence detection unit detects the pilot sequence, estimate a polarization state of signals of the first polarization at the receiver by performing maximal ratio combining on H polarization components and V polarization components at the first frequency in detected pilot sequences, and estimate a polarization state of signals of the second polarization at the receiver by performing maximal ratio combining on H polarization components and V polarization components at the second frequency in the detected pilot sequences;

an equalizer to demultiplex signals of the first polarization and signals of the second polarization from the output signal of the A/D converter on a basis of the polarization states estimated by the polarization estimator;

a phase estimator to estimate and compensate a phase of a signal of the first polarization and a signal of the second polarization, demultiplexed by the equalizer; and a decoder to determine and decode a signal of the first polarization and a signal of the second polarization, of which phase has been compensated by the phase estimator.

2. The optical communication device according to claim 1, wherein the pilot sequence detector detects the pilot sequence by Fourier-transforming an output signal of the A/D converter.

3. An optical communication device, comprising:

a transmitter to transmit optical signals including polarization multiplexed signals multiplexing signals of a first polarization on which a burst signal including, at a beginning thereof, a pilot sequence having a single frequency component of a first frequency, is generated and a second polarization orthogonal to the first polarization, on which a burst signal including, at a beginning thereof, a pilot sequence having a single frequency component of a second frequency different from the first frequency, is generated; and a receiver to receive the optical signals from the transmitter;

wherein the receiver includes:

a coherent light receptor to output a coherent detection signal by performing conversion into an electrical signal by allowing the optical signals transmitted from the transmitter and local light to interfere with each other;

an A/D converter to convert the coherent detection signal output from the coherent light receptor into a digital signal;

a pilot sequence detector to detect the pilot sequence from an output signal of the A/D converter;

a polarization estimator to, when the pilot sequence detector detects the pilot sequence, estimate a polarization state of signals of the first polarization at the receiver by performing maximal ratio combining on H polarization components and V polarization components at the first frequency in detected pilot sequences, and estimate a polarization state of signals of the second polarization at the receiver by performing maximal ratio combining on H polarization components and V polarization components at the second frequency in the detected pilot sequences;

an adaptive equalizer to demultiplex signals of the first polarization and signals of the second polarization from the output signal of the A/D converter on a basis of the polarization states estimated by the polarization estimator;

a coefficient updater to update a coefficient of the adaptive equalizer using, as an initial value, setting for demultiplexing a signal of the first polarization and a signal of the second polarization on a basis of the polarization states estimated by the polarization estimator, according to results calculated by using constant modulus algorithm;

a phase estimator to estimate and compensate a phase of a signal of the first polarization and a signal of the second polarization, demultiplexed by the adaptive equalizer; and a decoder to determine and decode a signal of the first polarization and a signal of the second polarization, of which phase has been compensated by the phase estimator.

4. The optical communication device according to claim 3, wherein the pilot sequence detector detects the pilot sequence by Fourier-transforming an output signal of the A/D converter.

* * * * *